(12) United States Patent
Park et al.

(10) Patent No.: US 9,796,845 B2
(45) Date of Patent: *Oct. 24, 2017

(54) NYLON-BASED RESIN COMPOSITE

(75) Inventors: Jung Hoon Park, Uiwang-si (KR); Young Jun Lee, Uiwang-si (KR); Tae Uk Kim, Uiwang-si (KR); Bum Seok Youn, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/486,862

(22) Filed: Jun. 18, 2009

(65) Prior Publication Data

US 2009/0258967 A1 Oct. 15, 2009

Related U.S. Application Data

(63) Continuation-in-part of application No. PCT/KR2006/005622, filed on Dec. 21, 2006.

(30) Foreign Application Priority Data

Dec. 18, 2006 (KR) .................. 10-2006-0129328

(51) Int. Cl.

| | |
|---|---|
| *C08L 23/08* | (2006.01) |
| *C08L 51/06* | (2006.01) |
| *C08L 51/04* | (2006.01) |
| *C08L 51/08* | (2006.01) |
| *C08L 77/00* | (2006.01) |
| C08L 23/16 | (2006.01) |
| C08L 51/00 | (2006.01) |

(52) U.S. Cl.
CPC ............ *C08L 51/06* (2013.01); *C08L 51/003* (2013.01); *C08L 51/04* (2013.01); *C08L 51/085* (2013.01); *C08L 77/00* (2013.01); C08L 23/08 (2013.01); C08L 23/16 (2013.01); C08L 51/00 (2013.01)

(58) Field of Classification Search
CPC .. C08L 151/003; C08L 151/04; C08L 151/06; C08L 77/00
USPC ....... 524/606, 607, 492, 493, 494, 495, 538; 525/64, 902
See application file for complete search history.

(56) References Cited

U.S. PATENT DOCUMENTS

| | | | | |
|---|---|---|---|---|
| 4,485,214 A * | 11/1984 | Ochiai et al. .................. | 525/179 |
| 5,013,786 A | 5/1991 | Payne et al. | |
| 5,104,924 A | 4/1992 | Goetz et al. | |
| 5,763,561 A | 6/1998 | Keske | |
| 5,962,628 A | 10/1999 | Keske | |
| 6,075,091 A * | 6/2000 | Tanaka et al. .................. | 525/66 |
| 6,207,745 B1 | 3/2001 | Bersted et al. | |
| 6,306,951 B1 * | 10/2001 | Montag et al. ............... | 524/505 |
| 6,319,986 B1 | 11/2001 | Amimoto et al. | |
| 6,531,529 B2 | 3/2003 | Bersted et al. | |
| 6,756,439 B2 | 6/2004 | Chang | |
| 6,759,474 B1 | 7/2004 | Keener et al. | |
| 7,147,288 B2 | 12/2006 | Grasse et al. | |
| 2002/0000290 A1 * | 1/2002 | Crump et al. ................. | 156/245 |
| 2003/0229162 A1 * | 12/2003 | Matsuoka et al. .............. | 524/81 |
| 2004/0242737 A1 * | 12/2004 | Topulos ........................ | 524/115 |
| 2005/0250886 A1 | 11/2005 | Stoppelmann et al. | |
| 2005/0260456 A1 * | 11/2005 | Hanai et al. ................ | 428/840.1 |
| 2006/0124906 A1 | 6/2006 | Bradley et al. | |
| 2009/0043034 A1 * | 2/2009 | Ishiduka et al. .............. | 524/451 |
| 2009/0258967 A1 | 10/2009 | Park et al. | |
| 2010/0069539 A1 * | 3/2010 | Morimoto ............... | C07F 9/067 524/100 |
| 2010/0324188 A1 * | 12/2010 | Youn et al. .................... | 524/413 |
| 2011/0293868 A1 | 12/2011 | Stoppelmann et al. | |

FOREIGN PATENT DOCUMENTS

| | | | |
|---|---|---|---|
| CN | 1255933 A | 6/2000 | |
| CN | 1696201 A | 11/2005 | |
| EP | 0376616 A2 | 12/1989 | |
| EP | 0826731 B1 | 3/1998 | |
| EP | 1312647 A2 * | 5/2003 | ............. C08L 77/00 |
| EP | 1354915 A1 | 10/2003 | |
| EP | 1972659 A1 | 9/2008 | |
| EP | 2100919 A1 | 9/2009 | |
| GB | 2318120 A | 4/1998 | |
| JP | 58-076431 | 5/1983 | |
| JP | 60-018542 | 1/1985 | |
| JP | 02-004861 | 1/1990 | |
| JP | 02-088671 | 3/1990 | |

(Continued)

OTHER PUBLICATIONS

Machine translation of JP 07010591 A (2011).*
Machine Translation of JP 2006045390 A (2011).*
Opposition in EP 2125954 (application No. 06 85 326.7).*
International Search Report in counterpart International Application No. PCT/KR2006/005622, Mailed Sep. 3, 2007.
International Search Report and Written Opinion in commonly owned International Application No. PCT/KR2008/007746, dated Aug. 17, 2009, pp. 1-6.
Office Action in commonly owned U.S. Appl. No. 12/824,267 dated Mar. 23, 2011, pp. 1-16.
Japanese Office Action in counterpart Japanese Application No. 2009-542619 dated Jul. 3, 2012, pp. 1-3.
Japanese Office Action in counterpart Japanese Application No. 2009-542619 dated Feb. 23, 2012, pp. 1-4.
European Search Report in counterpart European Application No. 06835326.7 dated May 23, 2012, pp. 1-4.
Office Action in counterpart Japanese Application No. 2012-242058 dated Mar. 18, 2014, pp. 1-5.
Office Action in counterpart Chinese Application No. 201210447637.6 dated Jul. 7, 2014, pp. 1-7.

(Continued)

*Primary Examiner* — Mark Kaucher
(74) *Attorney, Agent, or Firm* — Additon, Higgins & Pendleton, P.A.

(57) ABSTRACT

Disclosed is a nylon-based resin composite that has a sufficiently low moisture absorption rate to substantially prevent the occurrence of deformation and can attain both low warpage and improved impact resistance. The nylon-based resin composite comprises about 100 parts by weight of a base resin and about 1 to about 30 parts by weight of an impact modifier wherein the base resin comprises about 20 to about 80% by weight of a modified nylon-based thermoplastic resin containing benzene rings in the main chain and about 20 to about 80% by weight of a flat reinforcing fiber having a cross-sectional aspect ratio of about 1.5 or more.

11 Claims, No Drawings

(56) References Cited

FOREIGN PATENT DOCUMENTS

| | | | |
|---|---|---|---|
| JP | 03-163137 A | 7/1991 | |
| JP | 07010591 A * | 1/1995 | ............ C03B 37/16 |
| JP | 07018186 A | 1/1995 | |
| JP | 07233321 A | 9/1995 | |
| JP | 08-092477 A | 4/1996 | |
| JP | 10077405 A | 3/1998 | |
| JP | 10-169640 | 6/1998 | |
| JP | 10265666 A | 10/1998 | |
| JP | 11-001555 | 1/1999 | |
| JP | 2002-226705 A | 8/2002 | |
| JP | 2003-082228 A | 3/2003 | |
| JP | 2005-520904 A | 7/2005 | |
| JP | 2006045390 A * | 2/2006 | |
| JP | 2006-316079 A | 11/2006 | |
| JP | 2007-302866 A | 11/2007 | |
| JP | 5295974 A | 4/2010 | |
| KR | 1020070039610 A | 4/2007 | |
| KR | 10-0723248 B1 | 5/2007 | |
| KR | 10-756349 | 9/2007 | |
| KR | 10-0810966 B1 | 2/2008 | |
| WO | 90/03418 A1 | 4/1990 | |
| WO | 2008/070157 A2 | 6/2008 | |
| WO | 2008/075809 A1 | 6/2008 | |
| WO | 2009/084892 A2 | 7/2009 | |

OTHER PUBLICATIONS

English-translation of Office Action in counterpart Chinese Application No. 201210447637.6 dated Jul. 7, 2014, pp. 1-7.
Intention to Grant in counterpart EP Application No. 06835326.7 dated Jan. 16, 2013, pp. 1-6.
Decision to Grant in counterpart EP Application No. 06835326.7 dated May 24, 2013, pp. 1-2.
Notice of Opposition in counterpart EP Application No. 068353267 dated Mar. 18, 2014 pp. 1-22.
Kraton, Polymers for Modification of Thermoplastics, http://docs.kraton.com/kraton/attachments/downloads/81311AM.pdf, (no date) pp. 1-20.
Kohn, Nylon Plastic Handbook, Hanser/Gardner Publication, Inc, Cincinnati, OH, (1995) pp. 566-569.
Kohn, Nylon Plastic Handbook, Hanser/Gardner Publication, Inc, Cincinnati, OH, (1995) pp. 372-374.
Pharmacopeia, Intrinsic Viscosity Table, http://www.pharmacopeia.cn/v29240/usp29nf24s0__m6v00100.html, Feb. 20, 2014, pp. 1-4.
Notices of Opposition in counterpart EP Application No. 06835326.7 dated Apr. 29, 2014, pp. 1-3.
Response to Notice of Opposition in counterpart EP Application No. 06835326.7 dated Jan. 9, 2015, pp. 1-32.
Merriam-Webster, Full definition of "AS", http://www.merriam-webster.com/dictionary/as, (no date) pp. 1.
Merriam-Webster, Webster's Third New International Dictionary of the English Language Unabridged, definition of "As" (1966), pp. 125.
English Translation of Korean Publication No. 2006-0129328, filed Dec. 18, 2006, pp. 1-18.
Response to Summons in counterpart EP Application No. 06835326.7 dated Apr. 29, 2016, pp. 1-7.
Notice of Revocation of EP Application No. 06835326.7 dated Jun. 30, 2016, pp. 1.
Provision of the Minutes of the Oral Proceedings in counterpart EP Application No. 06835326.7 dated Jul. 28, 2016, pp. 1-4.
Decision revoking the European Patent in counterpart EP Application No. 06835326.7 dated Jul. 28, 2016, pp. 1-23.

* cited by examiner

NYLON-BASED RESIN COMPOSITE

CROSS-REFERENCE TO RELATED APPLICATIONS

This non-provisional application is a continuation-in-part application of PCT Application No. PCT/KR2006/005622, filed Dec. 21, 2006, pending, which designates the U.S. and which is hereby incorporated by reference in its entirety, and claims priority therefrom under 35 USC Section 120. This application also claims priority under 35 USC Section 119 from Korean Patent Application No. 10-2006-0129328, filed Dec. 18, 2006, the entire disclosure of which is also hereby incorporated by reference.

FIELD OF THE INVENTION

The present invention relates to a nylon-based resin composite.

BACKGROUND OF THE INVENTION

The development of nylons as engineering plastics has a history of almost four decades, but there is still a growing demand for nylons.

There are many basic types of nylon, including nylon 6, nylon 66, nylon 610, nylon 612, nylon 11, nylon 12, copolymers thereof, and blends thereof. Nylons have various inherent characteristics which render them useful for different purposes depending on a particular desired performance characteristic. Based on these characteristics, there continues to be a great demand for nylon products.

Particularly, composites of nylon resins and inorganic reinforcing materials (e.g., a glass fiber) exhibit high mechanical strength and markedly improved heat resistance, and thus they are used as structural materials and interior/exterior materials for automobiles.

However, since nylon resins have a high moisture absorption rate due to their molecular structures, they exhibit dimensional instability and high warpage. Further, the addition of inorganic material to nylon resins causes low impact resistance of the resulting composites.

It is generally known that impact resistance of a composite of a nylon resin and an inorganic material is low because stress accumulates at the interfaces between the nylon molecules and the inorganic material due to low interfacial binding force between the nylon resin and the inorganic material when multiple impacts are applied to the composite. As a result, cracks can occur at the interfaces.

Further, since weak C—C bonds present in the main chain of a nylon resin tend to be cleaved due to the inherent structural characteristics of the nylon resin, it can be difficult to minimize warpage of the nylon resin.

This problem can be solved to some extent by the addition of an inorganic reinforcing material to a nylon resin. Improvement in the warpage of the resulting composite provided by the inorganic reinforcing material, however, is negligible.

Further, although the warpage of the composite is slightly decreased by the addition of the inorganic reinforcing material, a low interfacial binding force between the inorganic reinforcing material and the nylon molecules results in poor mechanical properties (e.g., low impact resistance) of the composite.

SUMMARY OF THE INVENTION

The present invention is directed to a nylon-based resin composite that can exhibit low warpage and improved impact resistance as well as high mechanical strength. The present invention also provides a nylon-based resin composite that has a sufficiently low moisture absorption rate to substantially prevent the occurrence of deformation.

According to an embodiment of the present invention, there is provided a nylon-based resin composite comprising about 100 parts by weight of a base resin and about 1 to about 30 parts by weight of an impact modifier wherein the base resin comprises about 20 to about 80% by weight of a modified nylon-based thermoplastic resin containing benzene rings in the main chain and about 20 to about 80% by weight of a reinforcing fiber having a cross-sectional aspect ratio of about 1.5 or more.

The nylon-based resin composite of the present invention has a sufficiently low moisture absorption rate to substantially prevent the occurrence of deformation and can attain both low warpage and improved impact resistance.

DETAILED DESCRIPTION OF THE INVENTION

The present invention provides a nylon-based resin composite comprising about 100 parts by weight of a base resin and about 1 to about 30 parts by weight of an impact modifier wherein the base resin comprises about 20 to about 80% by weight of a modified nylon-based thermoplastic resin containing benzene rings in the main chain and about 20 to about 80% by weight of a reinforcing fiber having a cross-sectional aspect ratio of about 1.5 or more.

Specific details of other embodiments are included in the following description. The advantages and features of the present invention and methods for achieving them will become more apparent from the following embodiments that are described in detail below. However, the present invention is not limited to the illustrated embodiments and may be embodied in various different forms. Rather, the disclosed embodiments are provided so that the disclosure of the present invention will be thorough and complete, and will fully convey the scope of the invention to those skilled in the art to which the present invention pertains. The scope of the present invention is defined by the claims that follow.

The nylon-based resin composite according to the embodiment of the present invention comprises a base resin and an impact modifier.

The base resin includes a modified nylon-based thermoplastic resin and a reinforcing fiber.

The modified nylon-based resin contains benzene rings in the main chain, as represented by Formula I:

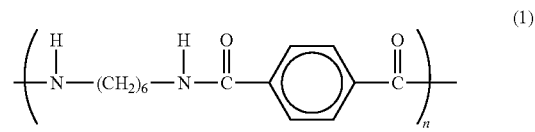

wherein n is from 50 to 500.

The modified nylon represented by Formula I is prepared by polycondensation of hexamethylene diamine with terephthalic acid, and is referred to simply as 'nylon 6T.'

The modified nylon-based thermoplastic resin can have an intrinsic viscosity of about 0.7 to about 0.9 dl/g, an average molecular weight of about 10,000 to about 100,000, and a moisture absorption rate of about 0.1% or less.

The reinforcing fiber is used to enhance the low warpage and heat resistance of the nylon-based resin composite. The reinforcing fiber can be selected from glass fibers, carbon fibers, aramid fibers, potassium titanate fibers, silicon carbide fibers, and combinations thereof.

The reinforcing fiber is specially designed in the form of a plate whose cross-sectional aspect ratio is about 1.5 or more and length is within the range of about 2 mm to about 13 mm.

The cross-sectional aspect ratio is defined as a ratio of the longest diameter (width, 'a') to the shortest diameter (height, 'b') in the cross section of the reinforcing fiber, as depicted in the following drawing.

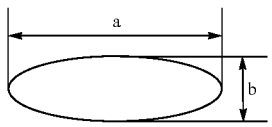

* cross-sectional aspect ratio = a/b

Reinforcing fibers have been used to increase the strength of thermoplastic resins. For example, glass fibers that have a length of 3 mm to 6 mm, a cross-sectional aspect ratio of about 1 (i.e. a circular cross section), and a cross-sectional diameter of 10 μm to 20 μm have been used. In contrast, the reinforcing fiber used in the present invention has a cross-sectional aspect ratio of about 1.5 or more, for example from about 2 to about 8.

A surface coupling agent can be coated on the surface of the reinforcing fiber in order to increase the binding force between the surface of the reinforcing fiber and the surface of the modified nylon-based thermoplastic resin. The surface coupling agent can be selected from urethane resins, epoxy resins, and combinations thereof.

The reinforcing fiber used in the present invention can have a moisture absorption rate of about 0.05% or less.

The base resin is defined to include the modified nylon-based thermoplastic resin and the reinforcing fiber. Taking into consideration the mechanical strength and production processing of the final nylon-based resin composite, the base resin can include about 20 to about 80% by weight of the modified nylon-based thermoplastic resin and about 20 to about 80% by weight of the reinforcing fiber.

A reactive olefinic copolymer or a core-shell copolymer may be used as the impact modifier.

The reactive olefinic copolymer may be an ethylene/propylene rubber, an isoprene rubber, an ethylene/octene rubber, an ethylene-propylene-diene terpolymer (EPDM), or the like, or a combination thereof. The reactive olefinic copolymer may be a graft copolymer in which about 0.1 to about 5% by weight of one or more reactive functional groups selected from maleic anhydride, glycidyl methacrylate, oxazoline, and combinations thereof are grafted onto an olefinic copolymer.

The grafting of the reactive functional group onto the olefinic copolymer can be readily carried out by those skilled in the art to which the present invention pertains.

The core-shell copolymer can be prepared by polymerizing at least one monomer selected from monomers of diene rubbers, acrylate rubbers, silicone rubbers, and the like, and combinations thereof, to prepare a rubbery polymer, and grafting the rubbery polymer with at least one monomer selected from aromatic vinyl monomers such as styrene, α-methylstyrene, halogenated styrenes, and alkylated styrenes; acrylonitrile; methacrylonitrile; $C_1$-$C_8$ alkyl methacrylates; $C_1$-$C_8$ alkyl acrylates; maleic anhydride; N—($C_1$-$C_4$)alkyl-substituted maleimide; N-phenyl-substituted maleimide; and the like; and combinations thereof as graftable unsaturated compounds. The content of the rubber in the core-shell copolymer can range from about 30 to about 90 parts by weight.

Examples of the diene rubbers include without limitation butadiene rubbers, acrylic rubbers, ethylene/propylene rubbers, styrene/butadiene rubbers, acrylonitrile/butadiene rubbers, isoprene rubbers, ethylene-propylene-diene terpolymers (EPDM), and the like, and combinations thereof.

Examples of suitable acrylate monomers of acrylate rubbers include without limitation methyl acrylate, ethyl acrylate, n-propyl acrylate, n-butyl acrylate, 2-ethylhexyl acrylate, hexyl methacrylate, 2-ethylhexyl methacrylate, and the like, and combinations thereof. Curing (or cross-linking) agents may be used for the polymerization of the acrylate monomers. Examples of such curing agents include without limitation ethylene glycol dimethacrylate, propylene glycol dimethacrylate, 1,3-butylene glycol dimethacrylate, 1,4-butylene glycol dimethacrylate, allyl methacrylate, triallyl cyanurate, and the like, and combinations thereof.

The silicone rubbers may be synthesized from cyclosiloxanes. Exemplary cyclosiloxanes include without limitation hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, and the like, and combinations thereof.

At least one curing (or cross-linking) agent may be used in the preparation of the silicone rubbers. Examples of such curing agents include without limitation trimethoxymethylsilane, triethoxyphenylsilane, tetramethoxysilane, tetraethoxysilane, and the like, and combinations thereof.

The $C_1$-$C_8$ alkyl methacrylates and the $C_1$-$C_8$ alkyl acrylates are esters of methacrylic and acrylic acid, respectively, and are prepared from monohydric alcohols having one to eight carbon atoms.

Examples of these esters include without limitation methyl methacrylate, ethyl methacrylate, propyl methacrylate, and the like, and combinations thereof.

The preparation of the core-shell copolymer can be readily carried out by those skilled in the art to which the present invention pertains.

Taking into account the impact modification, flowability and other mechanical properties of the final nylon-based resin composite, the nylon-based resin composite can include the impact modifier in an amount of about 1 to about 30 parts by weight, for example about 2 to about 10 parts by weight, based on about 100 parts by weight of the base resin.

The nylon-based resin composite of the present invention may further comprise at least one additive selected from antioxidants, heat stabilizers, light stabilizers, flow enhancers, lubricants, antibacterial agents, release agents, nucleating agents and other additives so long as the additive does not impair the basic physical properties of the nylon-based resin composite. The additive(s) may be added in an amount of about 30 parts by weight or less, based on about 100 parts by weight of the base resin.

The resin composition of the present invention may be prepared by any known process. For example, the resin composition of the present invention can be prepared by mixing the essential components with at least one optional additive, melt-extruding the mixture within an extruder, and pelletizing the molten mixture.

The resin composition of the present invention may be molded into a variety of products. The resin composition of the present invention is suitable for the manufacture of interior/exterior materials for automobiles, highly heat-resistant materials for electronic components and exterior materials for electrical and electronic products, including computers, electric home appliances and cell phones.

Hereinafter, the nylon-based resin composite according to the embodiment of the present invention will be explained with reference to the following specific examples and comparative examples. These examples are provided to illustrate that the nylon-based resin composite of the present invention exhibits high flexural strength, high flexural modulus, high impact strength and low warpage. Disclosures that are not included herein will be readily recognized and appreciated by those skilled in the art, and thus their description is omitted.

1. Examples and Comparative Examples

Specific specifications of (A) a modified nylon-based resin, (B) reinforcing fiber and (C) an impact modifier used in the following examples and comparative examples are as follows.

(A) Modified nylon-based resin: A highly heat-resistant modified nylon (polyphthalamide: HTN-501, DuPont) containing benzene rings in the main chain is used.

(B) Reinforcing fiber having a cross-sectional aspect ratio of 1.5 or more: A glass fiber (CSG 3PA-820, Nitto Boseki, Japan) having a cross-sectional aspect ratio of 4 (width: 28 μm, height: 7 μm) is used.

(B') Glass fiber having a cross-sectional aspect ratio of about 1: A circular glass fiber (P952, Vetrotex) having a cross-sectional aspect ratio of about 1 (length: 3 mm, diameter: 10 μm) is used.

(C) Impact modifier: An olefinic impact modifier (Fusabond MN-493D, DuPont) is used.

Nylon-based resin composites having the compositions indicated in Table 1 are prepared.

2. Tests for Physical Properties of Nylon-Based Resin Composites (1) Flexural Strength The flexural strength of the nylon-based resin composites is measured in accordance with ASTM D-790 and the obtained values are expressed in kgf/cm$^2$.

(2) Flexural Modulus

The flexural modulus of the nylon-based resin composites is measured in accordance with ASTM D-790 and the obtained values are expressed in kgf/cm$^2$.

(3) Izod Impact Strength

Notched specimens and unnotched specimens of the respective nylon-based resin composites are produced. These specimens have a thickness of ⅛". The impact strength of the specimens is measured at room temperature (25° C.) by Izod testing in accordance with ASTM D-256 and the obtained values are expressed in kgf·cm/cm.

(4) Warpage

The distortion level (warpage) of the sample is evaluated by the following procedure. First, a sample is prepared by injection molding carried out by applying a 95% force in a 10 oz. injection machine while maintaining a temperature of a film gate mold, having a size of 6"×6" and a thickness of 1/16", at 80° C. Then, the mold is allowed to stand in a constant temperature/humidity room at 23° C. for 24 hours without applying any external force. Subsequently, the distortion level (warpage) of the sample is evaluated. The distortion level is assessed by fixing three vertices of the square sample in contact with the bottom and measuring the height of the remaining one vertex, which extends upward due to distortion of the sample. The distortion level is expressed as a mm unit

TABLE 1

|  | Example No. |  |  |  |  |  |
|---|---|---|---|---|---|---|
|  | Examples |  |  |  | Comparative Examples |  |
| Component | 1 | 2 | 3 | 4 | 1 | 2 |
| (A) Modified nylon-based resin | 50 | 60 | 70 | 80 | 50 | 70 |
| (B) Reinforcing fiber[1] | 50 | 40 | 30 | 20 | — | — |
| (B') Reinforcing fiber[2] | — | — | — | — | 50 | 30 |
| (C) Impact modifier | 3 | 3.6 | 4.2 | 4.8 | 3 | 4.2 |
| Flexural strength (kgf/cm$^2$) | 3000 | 2600 | 2000 | 1700 | 2700 | 1800 |
| Flexural modulus (kgf/cm$^2$) | 140000 | 110000 | 80000 | 60000 | 134000 | 72000 |
| Izod impact strength (kgf·cm/cm) Notched | 13 | 11 | 8.5 | 7.2 | 11 | 7 |
| Unnotched | 100 | 85 | 60 | 50 | 60 | 50 |
| Warpage (mm) | 0.3 | 0.5 | 0.7 | 1.0 | 1.2 | 4.5 |

Note:
[1]Reinforcing fiber having a cross-sectional aspect ratio of 1.5 or more
[2]Reinforcing fiber having a cross-sectional aspect ratio of about 1

Table 1 shows the test results for the flexural strength, flexural modulus, IZOD impact strength and low warpage of the nylon-based resin composites of Examples 1 to 4 and Comparative Examples 1 and 2.

The results of Table 1 demonstrate that the nylon-based resin composites of Examples 1 to 4 have high mechanical strength, improved impact resistance and low warpage with increasing content of the glass fiber.

The physical properties of the nylon-based resin composites of Examples 1 and 3 are compared with those of the nylon-based resin composites of Comparative Examples 1 and 2, which have the same content of glass fiber, respectively. The nylon-based resin composites of Examples 1 and 3 have higher mechanical strength and impact resistance than those of Comparative Examples 1 and 2, respectively. Particularly, the nylon-based resin composites of Examples 1 and 3 have low warpage and markedly increased unnotched impact strength when compared to those of Comparative Examples 1 and 2, respectively.

In exemplary embodiments of the invention, the nylon-based resin composite can have an unnotched impact strength of 50 kgf·cm/cm or higher and a warpage of 1 mm or less, as determined using the tests described herein. In other exemplary embodiments of the invention, the nylon-based resin composite can have a notched impact strength of 7 kgf·cm/cm or higher and a warpage of 1 mm or less, also as determined using the tests described herein. In other exemplary embodiments of the invention, the nylon-based resin composite can have a flexural strength of 1500 kgf/cm$^2$ or higher and a warpage of 1 mm or less, and/or a flexural modulus of 60000 kgf/cm$_2$ or higher and a warpage of 1 mm or less, also as determined using the tests described herein.

Although the present invention has been described herein with reference to the foregoing embodiments, the present invention is not limited to the embodiments and may be embodied in various different forms. Those skilled in the art will appreciate that the present invention may be practiced otherwise than as specifically described without changing the technical spirit or essential features of the present invention. Therefore, it should be understood that the foregoing embodiments are merely illustrative in all aspects and are not to be construed as limiting the present invention.

That which is claimed is:

1. A nylon-based resin composite consisting essentially of: about 100 parts by weight of a base resin, the base resin comprising about 50 to about 80% by weight of a modified nylon-based thermoplastic resin containing benzene rings in the main chain and about 20 to about 50% by weight of a reinforcing fiber having a cross-sectional aspect ratio of about 1.5 to 4, wherein said reinforcing fibers have a length of about 2 to about 13 mm;
    about 2 to 3.6 parts by weight of an impact modifier consisting of an ethylene/octene rubber grafted with one or more reactive functional groups; and
    optionally at least one additive selected from antioxidants, heat stabilizers, light stabilizers, flow enhancers, lubricants, antibacterial agents, release agents, nucleating agents, and combinations thereof,
    wherein then nylon-based resin composite has a warpage of 0.3 to 0.7 mm measured using a mold square sample having a size of 6"×6" and a thickness of 1/16" prepared at 80° C., then allowing that the mold square sample is allowed to stand in a constant temperature/humidity room at 23° C. for 24 hours without applying any external force, assessed by fixing three bottom vertices of the square sample, and measuring the height of the remaining one vertex, which extends upward due to distortion of the sample.

2. The nylon-based resin composite according to claim 1, wherein the reinforcing fiber comprises glass fibers, carbon fibers, aramid fibers, potassium titanate fibers, silicon carbide fibers, or a combination thereof.

3. The nylon-based resin composite according to claim 1, wherein the reinforcing fiber is a glass fiber.

4. A pellet produced by extruding the nylon-based resin composite according to claim 1.

5. The nylon-based resin composite according to claim 1, wherein the nylon-based resin composite has a warpage of 0.3 to 0.5 mm.

6. The nylon-based resin composite according to claim 1, wherein the nylon-based resin composite has a flexural modulus of 80,000 to 140,000 kgf/cm$^2$ measured in accordance with ASTM D-790.

7. The nylon-based resin composite according to claim 6, wherein the nylon-based resin composite has a flexural modulus of 110,000 to 140,000 kgf/cm$^2$ measured in accordance with ASTM D-790.

8. The nylon-based resin composite according to claim 1, wherein the nylon-based resin composite has a flexural strength of 2000 to 3000 kgf/cm$^2$ measured in accordance with ASTM D-790.

9. The nylon-based resin composite according to claim 8, wherein the nylon-based resin composite has a flexural strength of 2600 to 3000 kgf/cm$^2$ measured in accordance with ASTM D-790.

10. The nylon-based resin composite according to claim 1, wherein the nylon-based resin composite has a flexural modulus of 80,000 to 140,000 kgf/cm$^2$ measured in accordance with ASTM D-790; and a flexural strength of 2000 to 3000 measured in accordance with ASTM D-790.

11. The nylon-based resin composite according to claim 1, wherein the nylon-based resin composite has a warpage of 0.3 to 0.5 mm; a flexural modulus of 110000 to 140,000 kgf/cm$^2$ measured in accordance with ASTM D-790; and a flexural strength of 2600 to 3000 kgf/cm$^2$ measured in accordance with ASTM D-790.

* * * * *